July 29, 1947.  C. R. KEEP  2,424,828

AIR MIXING AND DISTRIBUTING DUCT FOR AIR CONDITIONING SYSTEMS

Filed Aug. 19, 1944

Inventor.
Charles R. Keep
By Robert J. Palmer
Attorney.

Patented July 29, 1947

2,424,828

UNITED STATES PATENT OFFICE 2,424,828

AIR MIXING AND DISTRIBUTING DUCT FOR AIR CONDITIONING SYSTEMS

Charles R. Keep, Norwood, Mass., assignor to
B. F. Sturtevant Company, Boston, Mass.

Application August 19, 1944, Serial No. 550,141

4 Claims. (Cl. 98—10)

This invention relates to air conditioning systems and relates more particularly to air conditioning systems for passenger vehicles such as railway passenger cars.

The S. M. Anderson Patent No. 2,204,114 discloses an air conditioning system of the most advanced type for railway passenger cars. A low dew point temperature is maintained in a refrigerant dehumidifier for ensuring low humidities in the air delivered to the passenger space, and the dehumidified air is reheated by mixture with air recirculated from the passenger space, in an overhead distributing duct.

This invention represents an improvement over that of said Anderson patent in that the dehumidified air is more thoroughly mixed with, and reheated by, the recirculated air.

An object of this invention is to mix cold dehumidified air with an overhead distributing duct structure, thoroughly with recirculated air for reheating the dehumidified air.

Another object of the invention is to distribute air chilled to a low dew point temperature, into the passenger space of a passenger vehicle, without drafts.

The invention will now be described with reference to the drawing, of which:

The air distributing duct 6 is arranged in the clerestory space of the car, and its perforated lower wall forms the central portion of the ceiling thereof. The duct has the vertical partition 7 dividing the duct 6 into a plurality of alternate passages 8 and 9.

Figure 2:
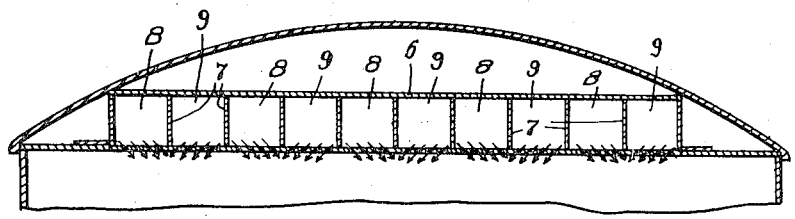
Fig. 2 is a sectional view along the lines 2—2 of Fig. 1.
Figure 3:
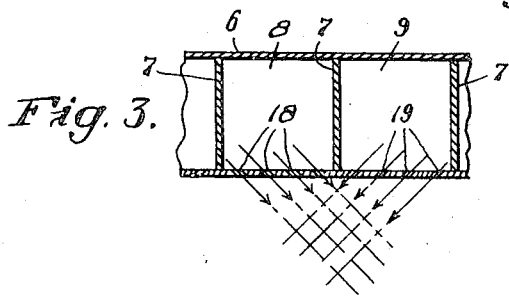
Fig. 3 is an enlarged view, in section, of a portion of the air distributing duct of Figs. 1 and 2.
Figure 4:
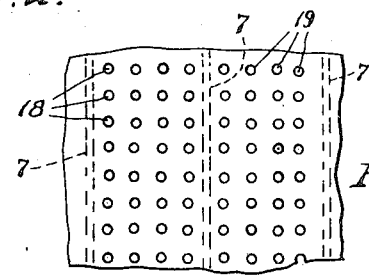
Fig. 4 is a fragmentary plan view looking upwardly at the bottom of the duct of Fig. 3.

The lower wall of the duct 6 under the passages 8 has a plurality of circular apertures 18 arranged with axes at angles to a plane perpendicular to the said lower wall so as to project air from the passages 8 to the right with respect to, and as illustrated by, Figs. 2 and 3 of the drawing.

The lower wall of the duct 6 under the passages 9 has a plurality of circular apertures 19 arranged with axes at angles to a plane perpendicular to said lower wall so as to project air from the passages 9 to the left with respect to, and as illustrated by, Figs. 2 and 3 of the drawing.

Figure 1:
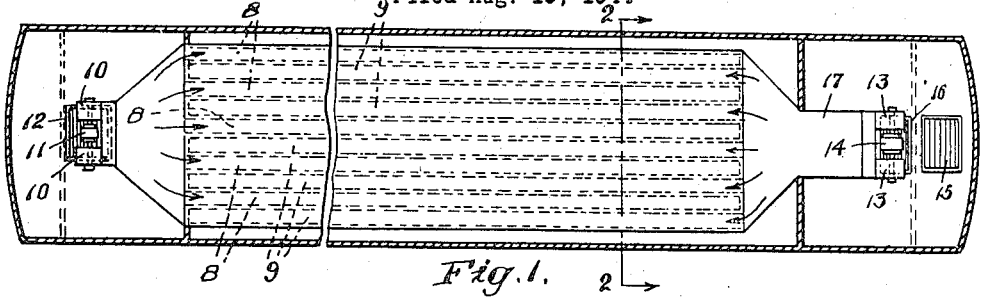
Fig. 1 is a plan view, partially in section, looking downwardly upon a railway passenger car embodying this invention.

The blowers 10 driven by the electric motor 11 are located in one end of the car illustrated by Figs. 1 and 2 and draw air recirculated from the passenger space through the recirculated air grille 12 and discharge it into the passages 8 in the duct 6. The passages 9 are closed at that end of the car so no air from the blowers 10 is supplied thereinto.

The blowers 13 driven by the electric motor 14 are located in the other end of the car, and draw outdoor air through the grille 15 and recirculated air through the grille 16 and blow the mixed air through the dehumidifier 17 into the passages 9, the passages 8 being closed at this end of the car so that the dehumidified air cannot enter thereinto.

The dehumidifier 17 may be a refrigerative dehumidifier of the type disclosed in said Anderson patent, and may chill the air passing therethrough to a dew point temperature of about 55° F.

The recirculated air discharged through the apertures 18, and the chilled air discharged through the apertures 19 are thoroughly mixed in the ceiling space of the car, the recirculated air acting as "by-pass" air and adding sensible heat to the chilled air so that when the mixed air reaches the passenger space, it has a sufficiently high dry bulb temperature so that it causes no discomfort to the passengers.

Figure 5:
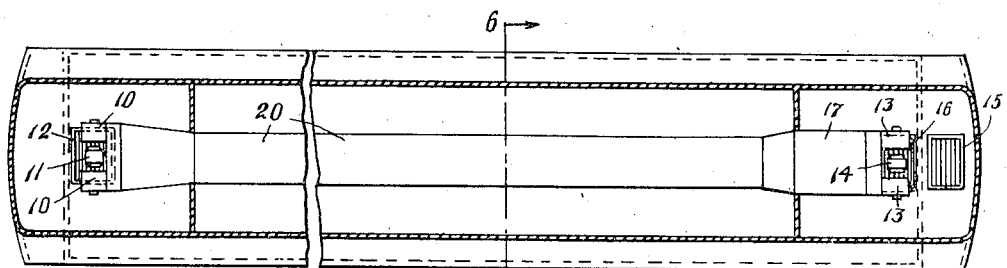
Fig. 5 is a plan view, partially in section, looking downwardly upon a railway passenger car containing another embodiment of this invention.
Figure 6:
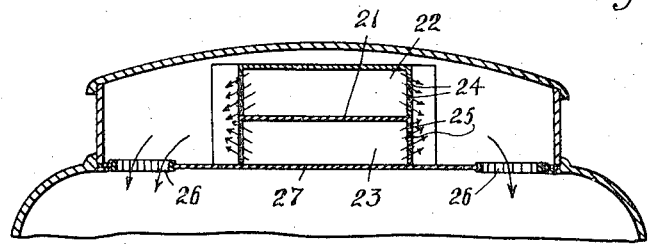
Fig. 6 is a sectional view along the lines 5—5 of Fig. 5.

In the embodiment of the invention illustrated by Figs. 5 and 6, the rectangular duct 20 has the horizontal partition 21 dividing it into the upper passage 22 and the lower passage 23. The vertical side walls of the duct alongside the passage 22 have the downwardly directed circular apertures 24, and alongside the passage 23 having the upwardly directed circular apertures 25.

The passage 22 is connected to the outlet of the dehumidifier 17 and the passage 23 is connected to the outlets of the blowers 10.

The chilled air stream from the passage 22 and the recirculated air stream from the passage 23 are directed into each other and are thoroughly mixed so that the chilled air absorbs heat from the recirculated air and the recirculated air gives up heat to the chilled air, the two streams arriving as in the arrangement illustrated by Figs. 1-3, at the same temperature.

The mixed air then passes through the grilles 26 in the ceiling 27, into the passenger space.

Due to the fact that substantial static pressures are built up in the chilled air passages, and the recirculated air passages, the air volumes supplied into every portion of the passenger space are the same and have the same condition.

While the blowers supplying air into the dehumidifiers and the blowers supplying the by-pass air have been described as located in opposite ends of the car, all blowers could be located in the same end of the car.

While embodiments of the invention have been described for the purpose of illustration, it should be understood that the invention is not limited to the exact apparatus and arrangements of apparatus illustrated, as modifications thereof may be suggested by those skilled in the art without departure from the essence of the invention.

What is claimed is:

1. An air conditioning system comprising means forming a pair of adjacent, aligned air passages overhead the space to be served with conditioned air, means for supplying chilled air, under pressure into one of said passages, means for supplying air recirculated from said space, under pressure, into the other of said passages, one of said passages having a wall aligned in a common plane with a wall of the other of said passages, said walls having spaced apertures formed therein, the apertures in said walls having axes intersecting outside said passages whereby the air from said passages is directed into converging streams outside same, said apertures having areas substantially less than the areas of the spaces between same whereby substantial air pressures can be built up in said passages.

2. An air conditioning system comprising means forming a plurality of pairs of parallel air passages having lower walls arranged in a common horizontal plane, means for supplying chilled air, under pressure, into one of said passages, means for supplying air recirculated from the space served with conditioned air, under pressure, into the other of said passages, said walls having a plurality of spaced apertures therein, said apertures having axes extending in such angles to said plane that the air from said passages is directed below same in converging streams, said apertures having areas substantially less than the areas of the spaces between same whereby substantial air pressures can be built up in said passages.

3. An air conditioning system comprising means forming a pair of parallel air passages having side walls arranged in a common vertical plane, means for supplying chilled air, under pressure, into one of said passages, means for supplying air recirculated from the space served with conditioned air, under pressure, into the other of said passages, said walls having a plurality of spaced apertures therein, said apertures having axes extending in such angles to said plane that the air from said passages is directed alongside same in converging streams, said apertures having areas substantially less than the areas of the spaces between same whereby substantial air pressures can be built up in said passages.

4. An overhead air distributing duct having a horizontal lower wall above the space to be supplied with conditioned air, a plurality of vertical partitions dividing said duct into a plurality of pairs of parallel air passages, said wall having a plurality of spaced apertures therein, said apertures being formed with axes at such angles to said wall that the air from adjacent said passages is directed therefrom in streams which converge below said wall, said apertures having areas substantially less than the areas of the spaces between same whereby substantial air pressures can be built up in said passages.

CHARLES R. KEEP.

REFERENCES CITED

The following references are of record in the file of this patent:

UNITED STATES PATENTS

| Number | Name | Date |
|---|---|---|
| 2,204,114 | Anderson | June 11, 1940 |
| 1,853,459 | Russell et al. | Apr. 12, 1932 |
| 2,320,596 | Henney | June 1, 1943 |
| 2,171,622 | Calkins | Sept. 5, 1939 |
| 2,199,341 | Henney | Apr. 30, 1940 |
| 2,195,411 | Germonprez | Apr. 2, 1940 |
| 1,737,661 | Lewis | Dec. 3, 1929 |
| 1,982,125 | Stacey, Jr., et al. | Nov. 27, 1934 |
| 986,731 | McGerry | Mar. 14, 1911 |
| 2,150,449 | Madden | Mar. 14, 1939 |
| 1,915,380 | Peterson et al. | June 27, 1933 |

FOREIGN PATENTS

| Number | Country | Date |
|---|---|---|
| 828,484 | France | Feb. 14, 1938 |